(12) United States Patent
Mehra et al.

(10) Patent No.: US 10,108,641 B2
(45) Date of Patent: Oct. 23, 2018

(54) METHOD AND SYSTEM FOR IMAGE DISCOVERY VIA NAVIGATION OF DIMENSIONS

(71) Applicant: Art.com, Inc., Emeryville, CA (US)

(72) Inventors: Madhav Mehra, Oakland, CA (US); Geoffroy Martin, Emeryville, CA (US); Thanigai Vellore, San Ramon, CA (US)

(73) Assignee: ART.COM, INC., Emeryville, CA (US)

( * ) Notice: Subject to any disclaimer, the term of this patent is extended or adjusted under 35 U.S.C. 154(b) by 839 days.

(21) Appl. No.: 14/139,623

(22) Filed: Dec. 23, 2013

(65) Prior Publication Data

US 2014/0122283 A1 May 1, 2014

Related U.S. Application Data

(63) Continuation of application No. 13/091,545, filed on Apr. 21, 2011, now Pat. No. 8,671,025.

(51) Int. Cl.
*G06F 17/30* (2006.01)
*G06Q 30/06* (2012.01)
*G06F 3/0484* (2013.01)

(52) U.S. Cl.
CPC .... *G06F 17/30277* (2013.01); *G06F 3/04845* (2013.01); *G06F 17/30274* (2013.01); *G06Q 30/06* (2013.01); *G06Q 30/0601* (2013.01)

(58) Field of Classification Search
CPC ...................................................... G06Q 30/06
USPC ........................................................ 705/26.1
See application file for complete search history.

(56) References Cited

U.S. PATENT DOCUMENTS

| | | | |
|---|---|---|---|
| 6,597,806 B1 * | 7/2003 | Kawada | G06K 9/32 382/151 |
| 7,149,983 B1 * | 12/2006 | Robertson | G06F 17/30398 715/763 |
| 2003/0016250 A1 | 1/2003 | Chang et al. | |
| 2003/0069878 A1 | 4/2003 | Wise | |
| 2003/0103673 A1 * | 6/2003 | Rathod | G06F 17/30259 382/199 |
| 2005/0210019 A1 | 9/2005 | Uehara et al. | |
| 2012/0019564 A1 | 1/2012 | Almgren et al. | |

FOREIGN PATENT DOCUMENTS

| | | |
|---|---|---|
| EP | 1 077 414 A2 | 2/2001 |
| EP | 1 202 187 A2 | 5/2002 |

OTHER PUBLICATIONS

European Search Report of European Application No. 12165061.8 dated Oct. 24, 2012, 6 pages.

(Continued)

*Primary Examiner* — Mila Airapetian
(74) *Attorney, Agent, or Firm* — Perkins Coie LLP

(57) ABSTRACT

Method and system for discovering artistic preferences by using a graphical user interface (GUI) tool to navigate through a collection of art images based on one or more dimensions within an art image. The GUI tool allows a user to display one or more selectable dimensions of a first image that, when selected, are used as a query to locate and display other images that have a dimension that is equal or similar to the one or more selected dimensions.

18 Claims, 10 Drawing Sheets

(56) References Cited

OTHER PUBLICATIONS

U.S. Appl. No. 13/091,545 of Mehra, M., et al., filed Apr. 21, 2011, now U.S. Pat. No. 8,671,025, on Mar. 11, 2014.
Non-Final Office Action dated Aug. 16, 2012, U.S. Appl. No. 13/091,545 of Mehra, M., et al. filed Apr. 21, 2011.
Non-Final Office Action dated Nov. 29, 2012, for U.S. Appl. No. 13/091,545 of Mehra, M., et al. filed Apr. 21, 2011.
Final Office Action dated May 20, 2013, U.S. Appl. No. 13/091,545 of Mehra, M., et al. filed Apr. 21, 2011.
Advisory Action dated Aug. 9, 2013, U.S. Appl. No. 13/091,545 of Mehra, M., et al. filed Apr. 21, 2011.
Notice of Allowance dated Nov. 19, 2013, U.S. Appl. No. 13/091,545 of Mehra, M., et al. filed Apr. 21, 2011.

\* cited by examiner

METHOD AND SYSTEM FOR IMAGE DISCOVERY VIA NAVIGATION OF DIMENSIONS

CLAIM OF PRIORITY

This application is a continuation of U.S. patent application Ser. No. 13/091,545, filed Apr. 21, 2011, and entitled "METHOD AND SYSTEM FOR IMAGE DISCOVERY VIA NAVIGATION OF DIMENSIONS", all of which is herein incorporated by reference.

FIELD OF THE INVENTION

At least one embodiment of the present invention pertains to searching for images based on a selected dimension of another image, more particularly, using a graphical user interface ("GUI") tool to display a searchable dimension of a first image that when selected by a user, is used as a search query to discover and display other images that have a similar attribute.

BACKGROUND

Art is the product or process of deliberately arranging symbolic elements in a way that influences and affects one or more of the senses, emotions, and intellect. It encompasses a diverse range of human activities, creations, and modes of expression, including music, literature, film, photography, sculpture, and paintings. Generally, art is made with the intention of stimulating thoughts and emotions.

Because there are millions of pieces of art available for purchase online, the individual seeking to discover new art is confronted with a "needle in the hay stack" challenge of locating a piece of art that satisfies that individual's subjective and objective preferences. One current challenge individuals face when attempting to discover art is that the current technology fails to provide an effective, intuitive, and efficient discovery tool that can help a user navigate through millions of art images to find a preferred art image, based on one or more searchable art-related dimensions.

Some traditional tools allow an individual to search for art based on a keyword entry that can be used as a query to search for art within a group (e.g. a database), based on, for example, a piece of art's title, an artist's name, or a medium (e.g., a painting, tapestry, or sculpture). However, these tools limit the search to a small number of characteristics that result in resultant images that may be poorly correlated to the initial query. Additionally, the keyword search essentially acts as a filter narrowing the possible choices.

Another problem with these tools is that they are based on the assumption that the individual generally knows what he or she is looking for. Traditional tools are designed to converge on a single result, in a manner that is similar to searching the Yellow Pages for an address for a specific retailer or searching for the answer to the question, "What is the capital of California." This approach may be effective for an individual seeking a particular piece of art, such as a specific work created by Mark Rothko or a twentieth-century Rwandan bottle, for example; however, traditional tools fail to effectively help those individuals seeking to discover new art. Therefore, prior art has focused on the destination, the end goal of a search for art, not on the journey or the individual's path of discovery leading up to the end goal.

An individual who is on an educational journey to discover art may only possess a notion about the type of art that they are seeking. For example, they may only have a notion about a color scheme, a choice of lighting, a theme, or a subject used in the art; however, the individual may not initially have a preference concerning the other aspects, such as the medium (i.e. photograph, painting, tapestry, sculpture, etc.), and/or the artist.

In some cases, when discovering an art image, an individual may determine that only a subset of qualities of the image is desirable. In this case, the individual may wish to find more art that has these desirable qualities. However, traditional tools fail to provide an efficient, user-friendly method to allow the individual to effectively broaden the previous search into a new search for those art images that have the desirable qualities.

Therefore, the failure of current search technology to accurately and effectively allow an individual to discover art images based on particular, searchable dimensions limits the individual's discovery of art.

SUMMARY

Introduced herein are a method and system for discovering and displaying user-preferred pieces of art by searching a collection of art images by navigating through one or more selected dimensions of a first image.

In one embodiment, a user is presented with a first image and one or more dimensions of the first image by an image processing system. The first image can be presented to the user on a webpage. In a particular embodiment, the first image can be displayed on the webpage as a result of an initial keyword search performed by the user. The keyword search may be for a particular genre or a particular work of art, such as a keyword search for "Van Gogh," for example. In this example, the search for "Van Gogh" may result in the display of one or more images from a collection of Van Gogh's artwork. One or more dimensions of the displayed image can be selected by the user and utilized as part of a subsequent search to further discover other pieces of art related to the selected dimensions.

A dimension is an aspect or a characteristic associated with an art image. An art image may have any number of dimensions, such as, for example, the subject in the art piece, the artist who created the art, the colors used in the art, and/or a combination of characteristics useful for discovering pieces of art that are similar to another art image. A dimension can be manually associated with an art image as it can be entered into a database associated with the art image, for example. Alternatively, a dimension can be automatically extrapolated from an image using the image processing system's hardware, software, or a combination thereof.

A dimension of an art image may be based on a single characteristic, such as an artist's name or a work of art's title. In some embodiments, the user may select more than one dimension to initiate a multidimensional search for new art images. Alternatively or additionally, a dimension may be based on a function of multiple characteristics that are used in combination. A dimension having multiple characteristics may be based on a piece of art's combined use of texture, lighting, shapes and contours, and color balance, for example. For example, one dimension having multiple characteristics may be used to discover art pieces substantially similar to the first image.

A dimension of an art image can be user-selectable. A dimension selected by a user can trigger a discovery process to locate and display other art images that have a dimension that is equal or similar to the selected dimension. In one embodiment, multiple dimensions of the first image can be selected and utilized by the image processing system as a multidimensional query for discovering art images that have a dimension that is substantially equal to each of the user-selected dimensions.

The image processing system can provide a graphical association ("mapping" or "overlay") of an art image's respective dimensions. The user can utilize an input tool, such as a mouse, to individually select an art image in order to display a graphical overlay of the dimensions of the selected art image. The graphical overlay functions as a tool that allows the user to intuitively discover other pieces of art within a collection of art that have one or more dimensions that correlate to the selected dimension. For example, when an art image is selected, in some embodiments, the graphical overlay displays the selected image's dimension(s), and each displayed dimension is selectable so that subsequent searches based on one or more of the selected dimensions can be performed.

Continuing with the above example, the user can utilize an input tool, such as a mouse, to individually select one of the displayed images of Van Gogh. As a consequence of selecting The Starry Night, for example, a graphical overlay of the dimensions associated with The Starry Night are displayed to the user, where each displayed dimension is capable of being selected by the user to discover other art images that are related to the selected dimension(s) of The Starry Night. The user can select one or more of the displayed dimensions to trigger a new search for other art images that have dimensions that are equal or similar to the selected dimension(s). For example, the user may select a color dimension, which initiates a search for other art within a collection of art images that has substantially the same colors utilized in The Starry Night. Alternatively or additionally, the user may select a subject matter dimension to cause the image processing system to locate art images that have the same subject-matter as The Starry Night, such as a night sky, swirling clouds, and stars above a small town.

In another embodiment, the graphical overlay may be semi-permanently displayed by the image processing system so that the user does not have to select an art image before its dimensions are displayed. In yet another embodiment, the graphical overlay can use a user's recorded dislikes to determine what kind of art the user may prefer. For example, the graphical overlay can display multiple art images that are similar to a first art image. The user can select one or more non-preferred images from the multiple images to cause the image processing system to extrapolate the dimensions of the non-preferred images that can be used as one or more filters to determine the preferred art images from the collection of art images.

To facilitate the user's discovery of new art based on a selected dimension of a first art image, the image processing system can base the search for new art from a collection of art on an entirely different dimension, genre, classification, and/or medium associated with the resultant image, for example. By broadening the available pool of art used for discovery the user can explore art that is substantially different from the original, first image, except for the selected dimension. For example, by selecting the color dimension of The Starry Night, the user may be led to discover a painting by Rothko, a Chinese vase, and/or a tapestry, where each has the same blue, yellow, black and white colors used in The Starry Night.

The image processing system can store a user's previous selections to increase the likelihood of determining a particular user's art preference. For example, if the picture of Rothko from the previous example is selected after The Starry Night was selected, in some embodiments, the image processing system will use the dimensions of both The Starry Night and the picture of Rothko, in combination, to determine the next list of art images to display to the user.

The number of dimensions associated with an art image corresponds to the number of characteristics that are recorded for the art image. In some embodiments an image may have multiple dimensions and in other embodiments an image may have a single dimension. In one embodiment, the number of dimensions displayed to a user can be a function of the shape art image. For example, a five-sided art image may have five displayed dimensions, one for each side of the image. In one embodiment, a selected art image has four dimensions, each of which are graphically represented on each of the four sides of the selected art image.

The particular kind of dimensions displayed to the user can be determined by the nature of the object within a selected image, or it can be automatically generated by the image processing system, for example, based on a probability and/or user preference stating that a particular dimension is of a higher interest to a user than another dimension.

In one embodiment, the selection of a dimension may lead to a display of sub-dimensions of the selected dimension, that, when selected, can initiate the discovery process to find art images that have the selected dimension.

In a further embodiment, the image processing system can be utilized to find other types of images that are not art images. For example, the techniques described above can operate similarly on any transactional entity, such as clothing, furniture, vehicles, homes, accessories, books, and even people within dating websites.

The solution presented herein overcomes the problems of the prior art's failure to accurately determine a user's art preferences by utilizing a process for discovering new art based on one or more art dimensions.

BRIEF DESCRIPTION OF THE DRAWINGS

One or more embodiments of the present invention are illustrated by way of example and are not limited by the figures of the accompanying drawings, in which like references indicate similar elements.

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not necessarily all refer to the same embodiment. References in this specification to "art," "art work," "piece of art," "art object," "art image," "art image" or the like, are used interchangeably.

Though the specification refers to "art," an "art processing environment" and "art images," the disclosed methods and systems contemplate the use of non-art-related objects; however, "art" is used throughout the specification to aid in the illustration of the disclosed method and system, not to serve as a limitation. The disclosed method and system can be utilized with art images or images of other entities. For example, the techniques described below can similarly operate on any transactional entity, such as clothing, furniture, vehicles, homes, accessories, books, and even dating websites.

Figure 1:
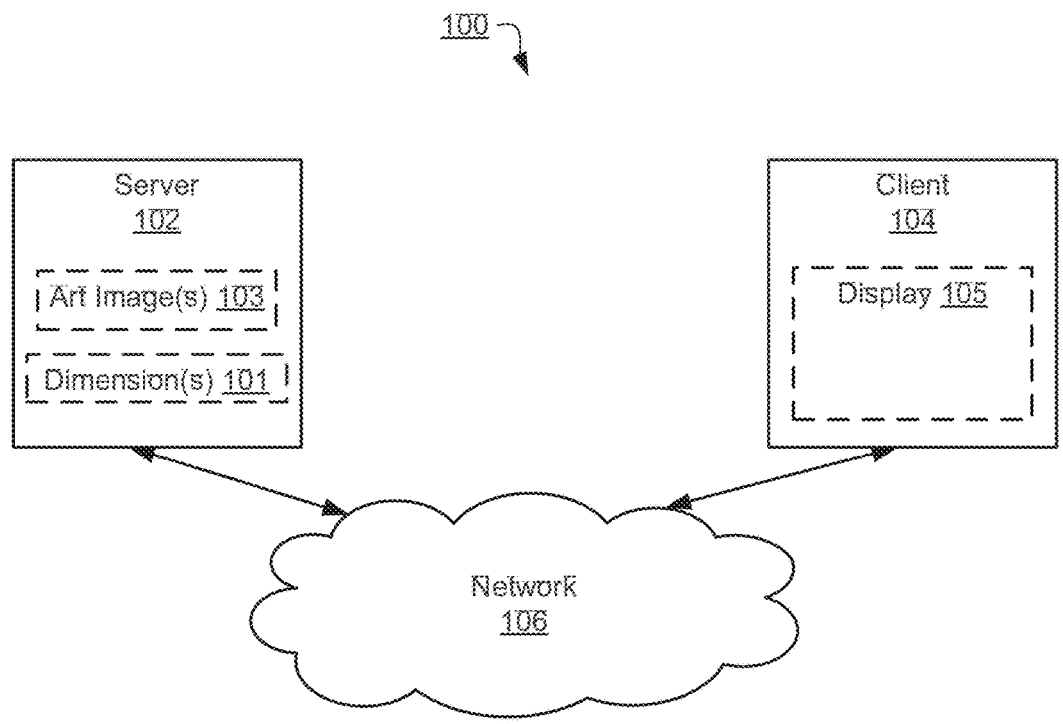
FIG. 1 illustrates an online image processing environment in which the present invention can be implemented.

FIG. 1 illustrates an online image processing environment 100 in which the present invention can be implemented. The online image processing environment described herein is for illustration of one type of configuration in which the techniques can be implemented. Other online image processing configurations and schemes can also be used for implementing the techniques introduced herein.

FIG. 1 illustrates an online image processing environment 100, which includes a server system 102 connected via a network 106 to client 104. The environment 100 can be utilized to perform aspects of the invention. For example, in one embodiment the environment 100 is used to determine a user's art preference based on the user's selection of an artistic dimension 101 of an art image 103 that has been displayed to the user.

The server 102 may be, for example, a standard computing system such as a personal computer or server-class computer, equipped with an operating system. The server 102 may perform various functions and management operations, such as storing art images 103, determining the dimensions 101 of the art images 103, storing and applying user preferences, receiving input from client 104, presenting user-selectable dimensions 101 of an art image 103 in a GUI 105 displayed at the client 104, and completing a user's online purchase of an art image 103.

Art images 103 are electronic files that store data representing an actual work of art or other object. The art images 103 can be stored on the server 102 and viewable by a user at client 104 via a display 105, web browser or other remote viewing device. Optionally, the art images 103 can be transferred over the network 106 and stored at client 104. Each art image 103 can consist of any medium, whether it is a picture or other wall covering, sculpture, architecture, metal work, ceramic, bust, vase, etc. Furthermore and as previously described, an art image 103 can contain non-art-related objects, such as books, apparel, furniture, vehicles, etc. The number of art images 103 available is variably dependent on the storage capacity available to the server 102.

The server 102 can connect, via the computer network 106, to client 104. Network 106 can be, for example, a telecommunications network, such as those based on second generation, third generation, or fourth generation mobile technology; a local area network; wide area network; or a global area network, such as the Internet, and can make use of any conventional or non-conventional network technologies.

The client 104 can be a standard computing device, such as a particular computer, laptop computer, tablet, or other computing system capable of connecting to the network 106. Additionally, client 104 can be a standard mobile computing device, such as an iPhone, Blackberry, or Android-based mobile phone, capable of connecting to the server 102 through the network 106.

The client 104 may include an input device (not shown), such as a keyboard, mouse, and/or touch-sensitive display 105 that receives input for performing functions based on user input. Additionally, the client 104 has a display 105 capable of displaying a web browser and/or a GUI, such as a graphical overlay tool, as described below. The client 104 may perform various functions and management operations, such as displaying images from the server 102, receiving user queries for art images, displaying a GUI tool for selecting the dimensions 101 of an art image 103, receiving the user's selected dimension for discovering new art images, and entering user preferences. Within the online image processing environment 100, any other suitable numbers of servers, clients, images, and/or networks may be employed.

Figure 2:
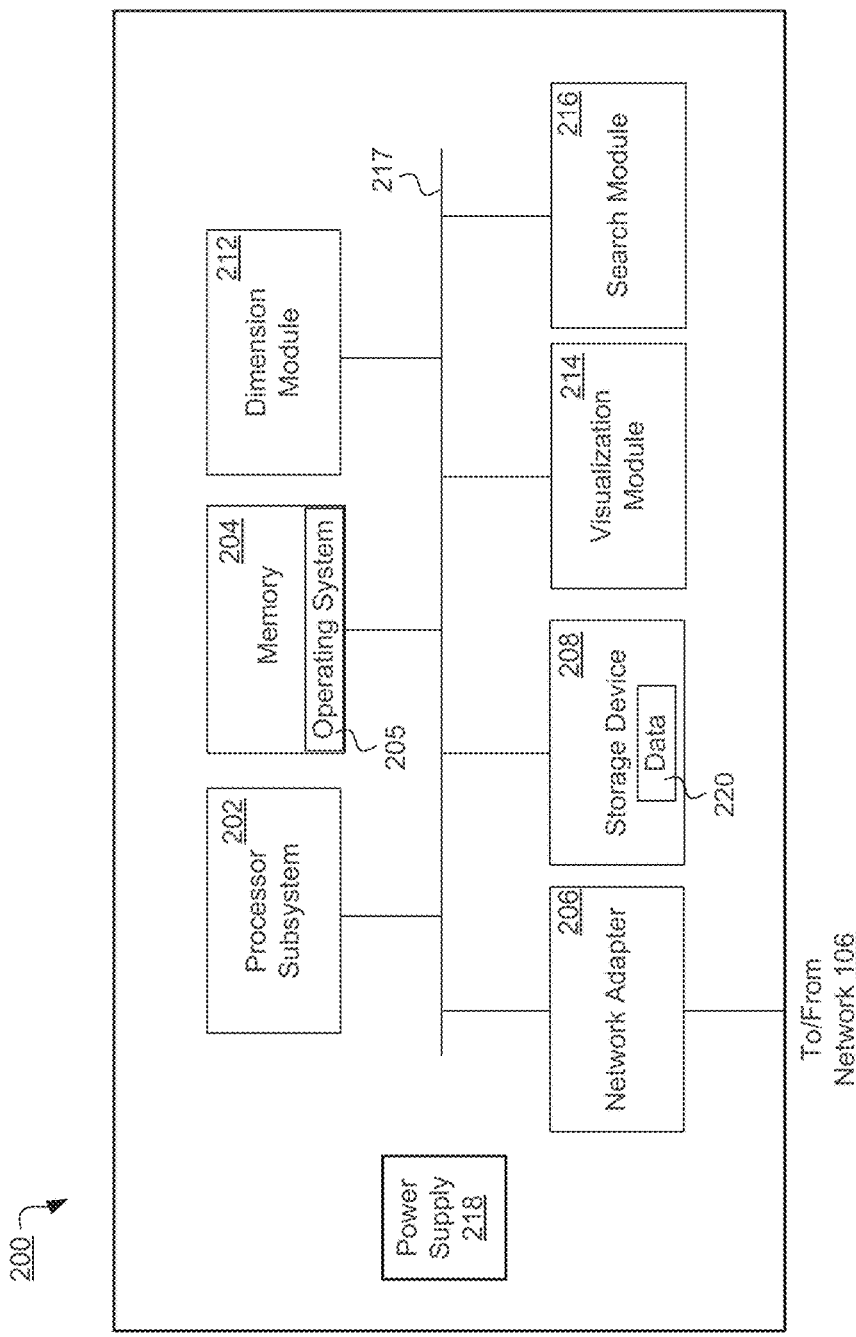
FIG. 2 is a block diagram showing an example of the hardware architecture of a computer that can perform the disclosed method and system.

FIG. 2 is a diagram illustrating an example of the internal architecture 200 of the server 102 that can implement one or more features of the invention. In the illustrated embodiment, the architecture 200 is a computer system that includes a processor subsystem 202 that further includes one or more processors. The server architecture 200 further includes a memory 204 including portions of an operating system 205, a network adapter 206, a storage device 208, a dimension module 212, a visualization module 214, and a search module 216, each interconnected by an interconnect 217 and powered by a power supply 218.

The architecture 200 can be embodied as a single- or multi-processor image processing system executing the server 102 that preferably implements a high-level module to determine and store the dimensions 101 of an art image 103, which are displayed for a user at a display 105 so that other art images 103 can be found that likely conform to the user's art preferences.

The memory 204 illustratively comprises storage locations that are addressable by the processors 202 and modules 212 through 216 in order to store software program code and data structures associated with the disclosed techniques. The processor 202 and modules 212 through 216 may, in turn, comprise processing elements and/or logic circuitry configured to execute the software code and manipulate the data structures. The operating system 205, portions of which are typically resident in the memory 204 and executed by the processor(s) 202, functionally organizes the server architecture 200 by (among other things) configuring the processor(s) 202 to invoke storage-, search-, visualization-, and dimension-related operations in support of the present invention. It will be apparent to those skilled in the art that other processing and memory implementations, including various computer readable storage media, may be used for storing and executing program instructions pertaining to the techniques introduced here.

The network adapter 206 includes one or more ports to couple the architecture 200 via the network 106 to the client 104. The network adapter 206 thus can include the mechanical, electrical, and signaling circuitry needed to connect the architecture 200 to the network 106. The server 102 and the client 104 can communicate, via the network 106, by exchanging discrete frames or packets of data (not shown) according to predefined protocols, such as Transmission Control Protocol and Internet Protocol. For example, the network adapter 206 can receive packets from the client 104, wherein the packets contain a user's selection of one or more of the dimensions 101 of an art image 103.

The storage device 208 cooperates with the operating system 205 to access information that has been requested by the server 102. Data 220, including art images 103, the dimensions 101 associated with each respective art images 103, and user profiles/preferences can be stored on any type of attached writable storage media, such as a magnetic disk or tape, optical disk (e.g., CD-ROM or DVD), flash memory, solid-state disk, electronic random access memory, micro-electro mechanical and/or any other similar media adapted to store data 220, including metadata and parity information. The storage device 208 may be external to the architecture 200 and accessible via a storage adapter (not shown), however as illustratively described herein, the information is stored on a non-volatile mass storage device within the architecture 200.

The operating system 205 facilitates the server's access to data 220, including art images 103 and their respective dimensions 101. The operating system 205 can be a conventional operating system, such as Windows®, Macintosh®, UNIX or Linux®.

The dimension module 216 contains logic sufficient to receive an art image 103 and extrapolate one or more dimensions 101 from the art image 103. An art image 103 that is used by the dimension module 216 can be stored with a dimension 101 that is associated with the art image 103, as data 220. The dimension 101 is a characteristic of the art image 103, such as the subject portrayed in the art image 103, the artist who created the art image 103, the colors used in the art image 103, and/or a combination of these or other characteristics (e.g. a texture characteristic, a lighting characteristic, a color balance characteristic, a shape characteristic, a contour characteristic, and a face recognition characteristic). The dimension 101 can be manually associated with the art image 103, for example, the dimension 101 can be entered as data 202 into a database and/or storage location that is associated with the art image 103. Alternatively or additionally, the dimension 101 can be automatically extrapolated from the art image 103 using the dimension module 212, which can identify a characteristic from metadata within the art image 103.

The dimension 101 may be based on a single characteristic, such as the color utilized in the piece of art, the artist's name, and/or the subject(s) within the art. Alternatively or additionally, the dimension 101 may be based on a combination of characteristics. For example, a similarity dimension, used to identify an art image 103 that is similar to a selected image, can be based on a combination of multiple characteristics, such as the art image's 103 use of texture, lighting, shapes and contours, and color balance.

In one embodiment, the dimension 101 of the art image 103 is user selected. For example, the dimension module 212, working with the network adapter 206, can send via the network 106 an art image 103 and its respective one or more dimensions 101 from the server 102 to be displayed at the client 104. The display 105 of the client 104 can display the art image 103 and the one or more dimensions 101 that are associated with the art images 103. The dimension 101 can be selected by using an input device, such as a mouse or touch screen, as described below. The selected dimension 101 can initiate the discovery process for searching and displaying other art images 103 that have a dimension that is equal or similar to the selected dimension 101.

The visualization module 214 contains logic sufficient to perform aspects of the presented techniques, such as creating a GUI tool 300 for discovering new art images 103 based on one or more dimensions 101 of the art image 103. The GUI tool 300 allows a user to intuitively discover art images 103 that have a dimension 101 that is equal or similar to a selected dimension of another art image 103.

In one embodiment, the GUI tool 300 can show on a display 105 a list of the art images 103 and a graphical overlay of the one or more dimensions 101 of a displayed art image 103. A portion of the list of displayed art images 103 may initially be shown using a webpage that is viewable at the display 105, for example. A user can use an input tool, such as a mouse, to select a displayed art image 103 to initiate a display of the GUI tool 300. In some embodiments, a user can select an art image 103 by moving the input device over the art image 103, causing the GUI tool 300 to display the dimension(s) 101 associated with the selected art image 103.

Figure 3:
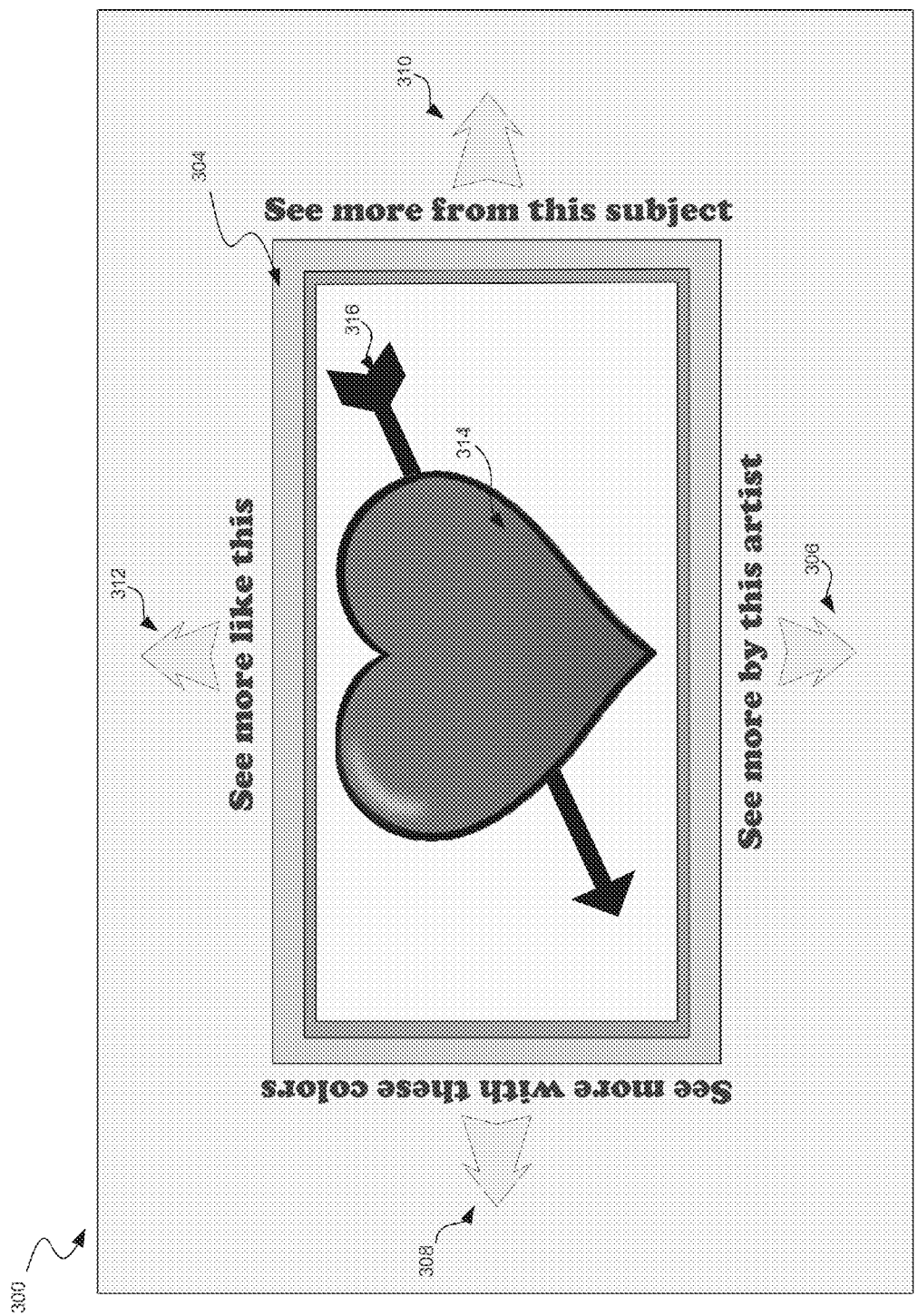
FIG. 3 is an example representation of a graphical user interface tool that can perform the disclosed method and system.

FIG. 3 is an example representation of a GUI tool 300 that can perform the disclosed method and system. In one embodiment, the GUI tool 300 displays one or more art images 103 and dimensions 101 of the art image 103 on a display 105. The number of dimensions 101 displayed by the GUI tool 300 can be based on the shape of the art image 103. For example, a five-sided art image 103 may have five displayed dimensions 101, one on each axis of the art image 101. In another example, and as illustrated in FIG. 3, the GUI tool 300 displays an image of a picture of a heart 304 and four dimensions 306, 308, 310, 312 overlain across the axes of the image of the heart 304. When an art image 103 has several dimensions 101, the image processing environment 100 can automatically choose which particular dimension to display based on, for example, the probability, as determined from previously collected user preferences that a particular dimension is of higher interest to a user than another dimension. Alternatively or additionally, that administrator of the image processing environment 100 can manually choose which dimension should be displayed.

The user can select displayed dimension 306-312 of the image of the heart 304 so that it can be used to discover new art images that are related to the selected dimension(s). The user may select one or more of the displayed dimensions 306-312 to initiate a query to search the art images 103 for art that has a dimension that is equal or similar to the selected dimension. For example, the user may select a color dimension 308 and initiate a search for other art within the collection that uses substantially the same colors as the colors used in the image of the heart 304. An artist dimension 306 is a dimension 101 that, when selected, causes a search for other art images 103 made by the artist who created the image of the heart 304, for example. The user may select a subject-matter dimension 310, which can be used by the image processing environment 100 to locate art that has the same or similar subject matter as the art image 103, such as the heart 314 and/or the arrow 316.

In some embodiments, the selection of a dimension 101 may lead the GUI tool 300 to display selectable sub-dimensions (not shown) of the selected dimension. For example, the subject-matter dimension 310 of the image of the heart 304 may have sub-dimensions, such as "hearts," "arrows," "love," "20th century abstract," "abstract," "abstract art by form," "abstract expressionism," "American art," "fine art," and/or "modern art," for example. The selection of a sub-dimension can initiate a new discovery process, similar to the one previously described.

In another embodiment, the GUI tool 300 may be semi-permanently displayed by the visualization module 214 so that the user does not have to select the art image 103 before its dimensions 306-312 are displayed to the user.

In yet another embodiment, the visualization module 214, in conjunction with the GUI tool 300, can display art images 103 that the user can designate as non-preferred images. The image processing environment 100 can use the dimensions 101 of the non-preferred images to determine which art images that are preferred by the user. For example, the visualization module 214 can configure the GUI tool 300 to present the user with multiple art images 103 so that the use can choose which one or more images that have one or more dimensions 101 that the user dislikes. The image processing environment 100 can record the user's selection(s) and extrapolate their dimensions 101 to be used as filters when determining which new art images 103 the user may prefer.

The image processing environment 100 may base a new search for art images from a collection of art images 103 on a related, or entirely different dimension 101, genre, classification, and/or medium that is associated with a newly selected art image 103, for example. By broadening the available pool of art the user can explore art that is substantially different from the originally selected art image, except for the selected dimension. For example, selecting of the color dimension 308 of the image of the heart 304 may cause a painting by Mark Rothko, a Chinese vase, and/or a tapestry to be displayed, where each item has the color dimension 308 of the image of the heart 304, but is otherwise pseudo-randomly selected so that the user can discover new art of various types.

The image processing environment 100 can store a user's previously selected art images 103 to increase the likelihood of determining the user's art preferences. For example, if the picture by Rothko from the previous example is selected after the image of the heart 304, in some embodiments the image processing environment 100 will use dimensions 101 of both the image of the heart 304 and the picture of Rothko (not shown) in combination to determine a potential list of art images 103 to be displayed at the client 104.

The search module 216 contains logic sufficient to search for art images 103 based on user input from the client 104. The user input from the client 104 may be a keyboard entry for a particular piece of art, artist, genre, or keyword, for example. Alternatively or additionally, a user input may be a selection from a predefined menu of categories that describe certain aspects of the art images 103. User input can also be generated when a user selects an art image 103 and/or a dimension 101 that is graphically represented on the GUI tool 300.

As discussed above, the discovery process for new art can be initiated when a user selects of a displayed dimension 306-312 of the image of the heart 304, for example. In one embodiment, the network adapter 206 of the image processing environment 100 receives the selected dimension from the client 104 via network 106. The search module 216 can use the selected dimension as a query to search the art images 103 for one or more images that have a dimension 101 that is similar to the selected dimension.

The search module 216 can perform a search by searching all or a portion of the art images 103 in a collection of art. Continuing from the previous example, if the user selected the color dimension 308 associated with the image of the heart 304 to be a focal point of a discovery of new art, the search module 208 can broadly search through the art images 103 by different artists, of various mediums (fine art, sculptures, tapestries, etc), and with various subject matters, so long as each piece of art utilizes the color dimension 308 of the image of the heart. Thus, the search module 126 can broaden the available pool of searchable art images 103 to include substantially different genres of art, for example, to enhance the user's process for discovering preferred art from semi-unrelated art genres.

Alternatively, the search module 216 may confine the discovery of new art to art images 103 having a particular dimension, even when the particular dimension is not user-selected. For example, when a user selects the color dimension 308, the search module 216 can limit the search to art images 103 both having the selected color dimension 308 of the image of the heart 304, and being of the same medium dimension (not shown) as the image of the heart 304. A user can thus narrow a search to a subset of art images 103 based on an expressed or implied preference specifying that a user looking for paintings having a certain color dimension 308, for instance, only desires other paintings with that color dimension 308, but is not interested in a sculpture or a tapestry.

In one embodiment, a history of previously viewed images can be maintained by the system (200). This history can be displayed to the user to allow the user to retrace his/her steps to rediscover and explore previously viewed images.

The client 104 shares an internal architecture similar to the previously described architecture 200, illustrated in FIG. 2. Therefore, the pertinent features described for the architecture 200 are additionally applicable to the client 104. Particularly, the client 104 has a processor 202, memory 204 having an operating system 205, power supply 218, network adapter 206, storage device 208, and interconnect 217. In addition to the features described for the architecture 200, the client 104 includes an input module for selecting and/or entering data, and a display module for displaying data, such as the GUI tool 300, art images 103, dimensions 101 of the art image 103, and other data communicated between the client 104 and the server 102.

Figure 4A:
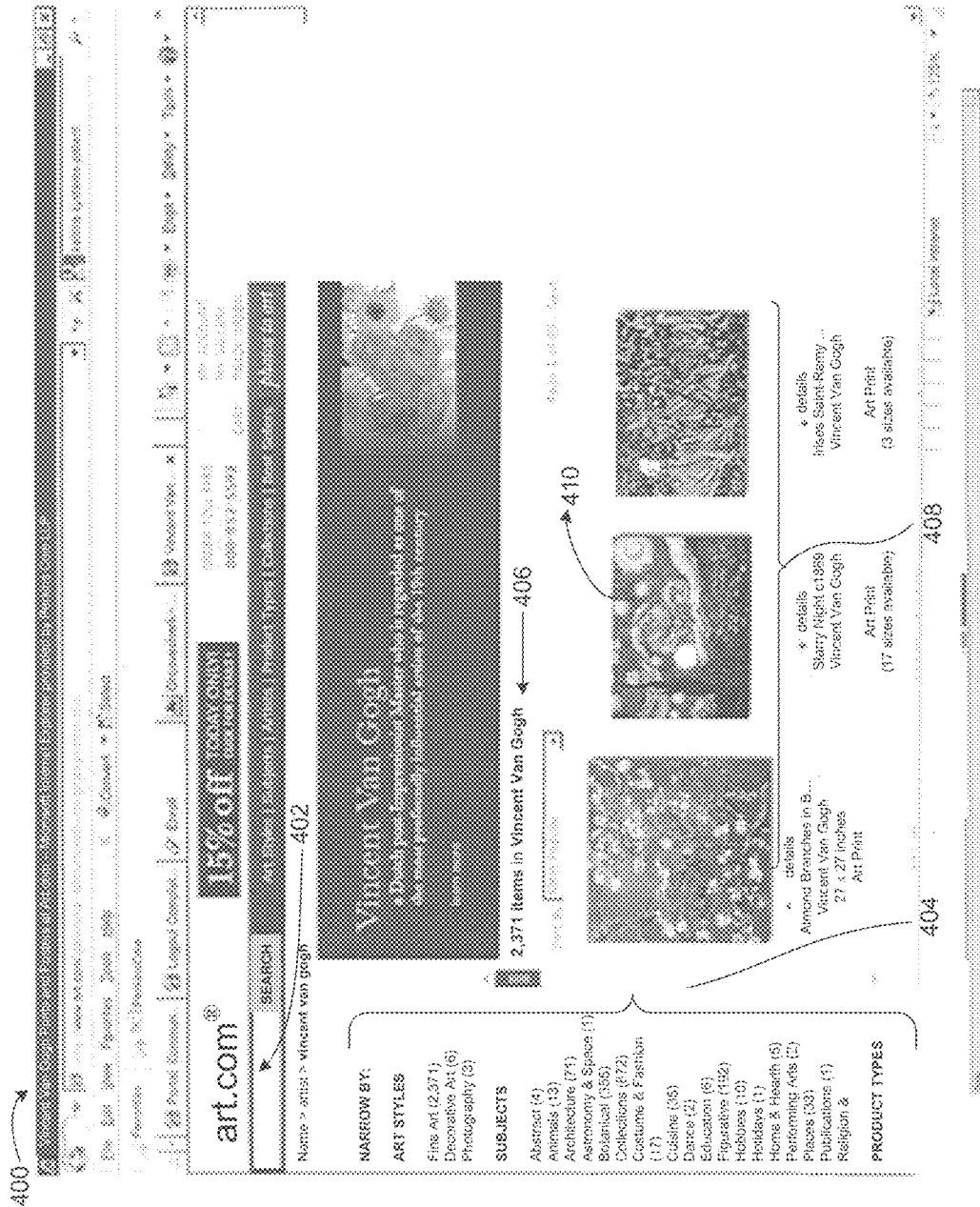
FIG. 4a is an example e-commerce website that can perform the disclosed method and system.

FIGS. 4a-4f illustrate a work-flow for purchasing a discovered art image from an online e-commerce website 400. FIG. 4a is an example e-commerce website 400 provided by the server 102 and shown at the display 105 of the client 104. In one embodiment, a user can start a discovery for art by entering a keyword into a keyword search field 402. Furthermore, the user can select a predefined category 404 to search for art images. In this example, the user entered "Vincent Van Gogh" into the keyword search field 402, which resulted in the display of a list of art images 408, including Van Gogh's The Starry Night 410.

Figure 4B:
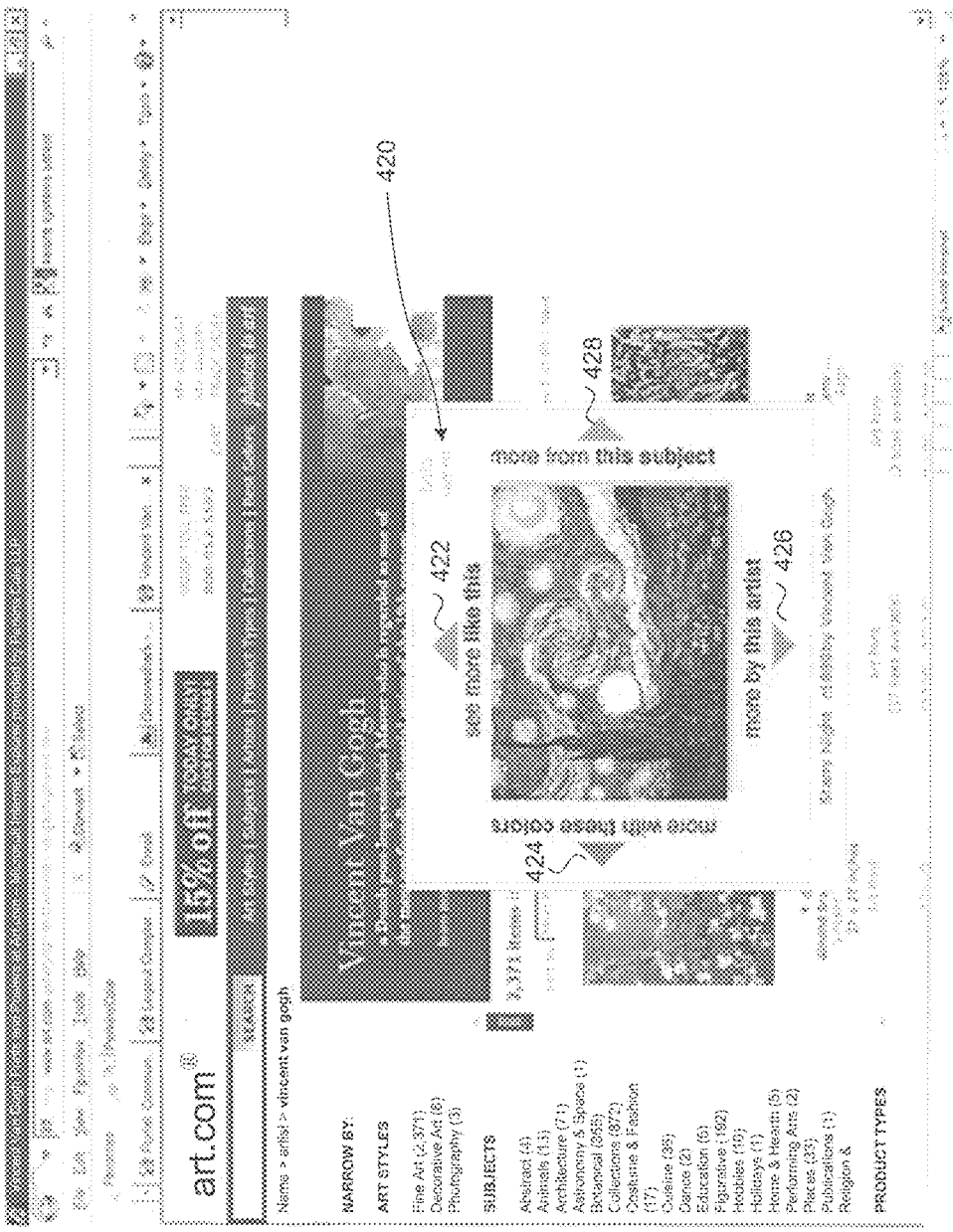
FIG. 4b is an example of a GUI tool for discovering art images based on artistic dimensions.

FIG. 4b is an example of the GUI tool 300 used to discover art images 103 based on artistic dimensions 101. FIG. 4b shows the GUI tool 300 as an object 420 on the website 400. The object 420 can be displayed on the website 400 after the user selects an art image 103, such as an image from the list of art images 408. In this example, the object 420 is shown on the website 400 as a result of the user selecting The Starry Night 410 from the list of art images 408.

The object 420 has four displayed dimensions 422, 424, 426, and 428, one at each side of The Starry Night 410. However, in another embodiment, additional or fewer dimensions 101 can be displayed. The four displayed dimensions 422, 424, 426, and 428 include a similarity dimension 422 (i.e. "see more like this"), a color dimension 424 (i.e. "more with these colors"), an artist dimension 426 (i.e.

"more by this artist), and a subject dimension 428 (i.e. "more from this subject"). Each of the four displayed dimensions 422, 424, 426, and 428 can be selected to initiate a further discovery for additional art images that are based on the selected dimension.

Figure 4C:
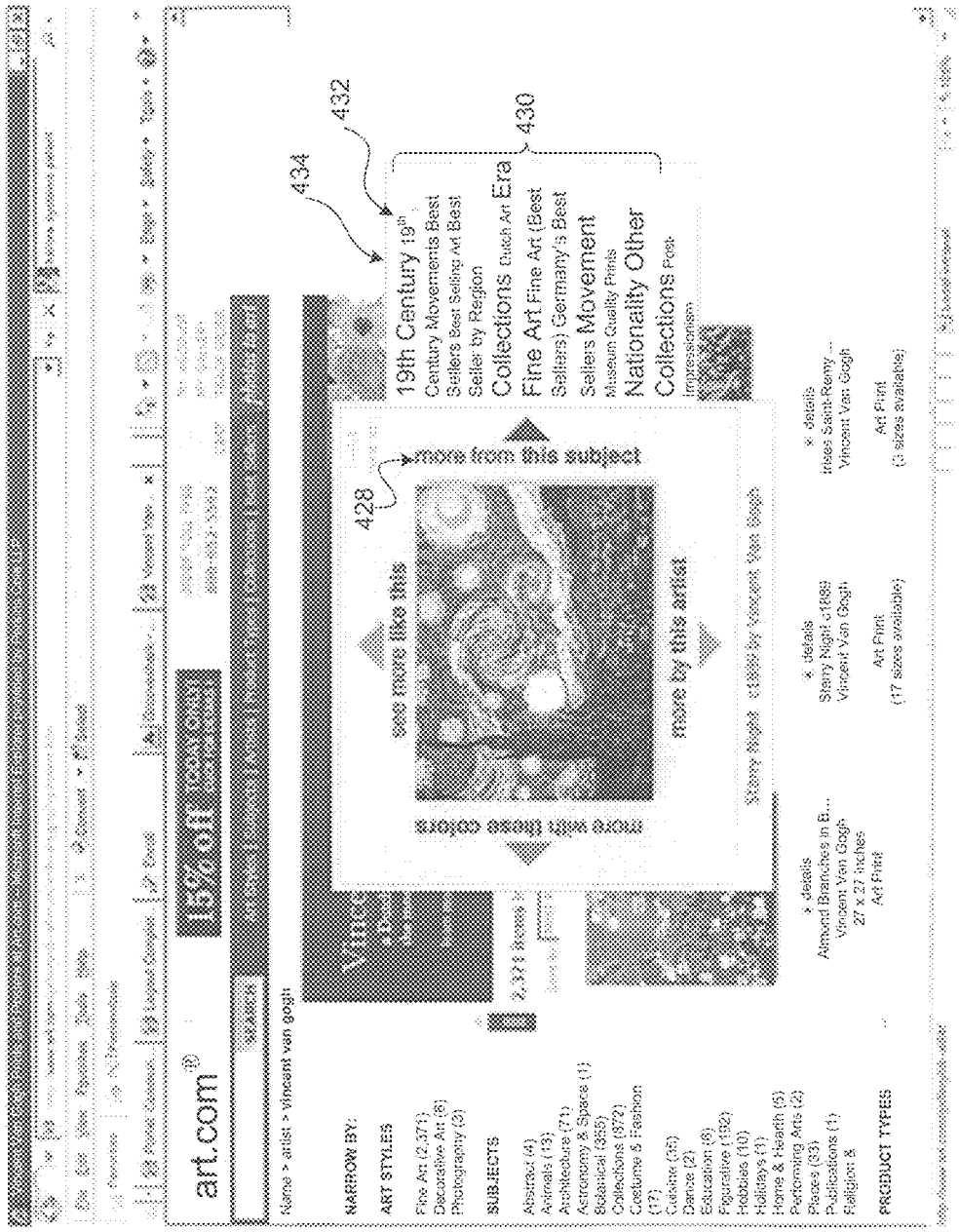
FIG. 4c illustrates sub-dimensions of a dimension of an art image.

FIG. 4c illustrates sub-dimensions 430 of a dimension 428 associated with an art image. More particularly, FIG. 4c shows sub-dimensions 430 of the subject dimension 428 associated with The Starry Night 420. The sub-dimensions 430 are contained within a separate window 434 that is extended from the selected dimension 428, however, other positions and configuration are contemplated. Each sub-dimension 430 can be selected by the user to continue their discovery for other art images related to the selected sub-dimension. In this example, the user may select to discover more art images based on the "19$^{th}$ Century Movements" sub-dimension 432.

Figure 4D:
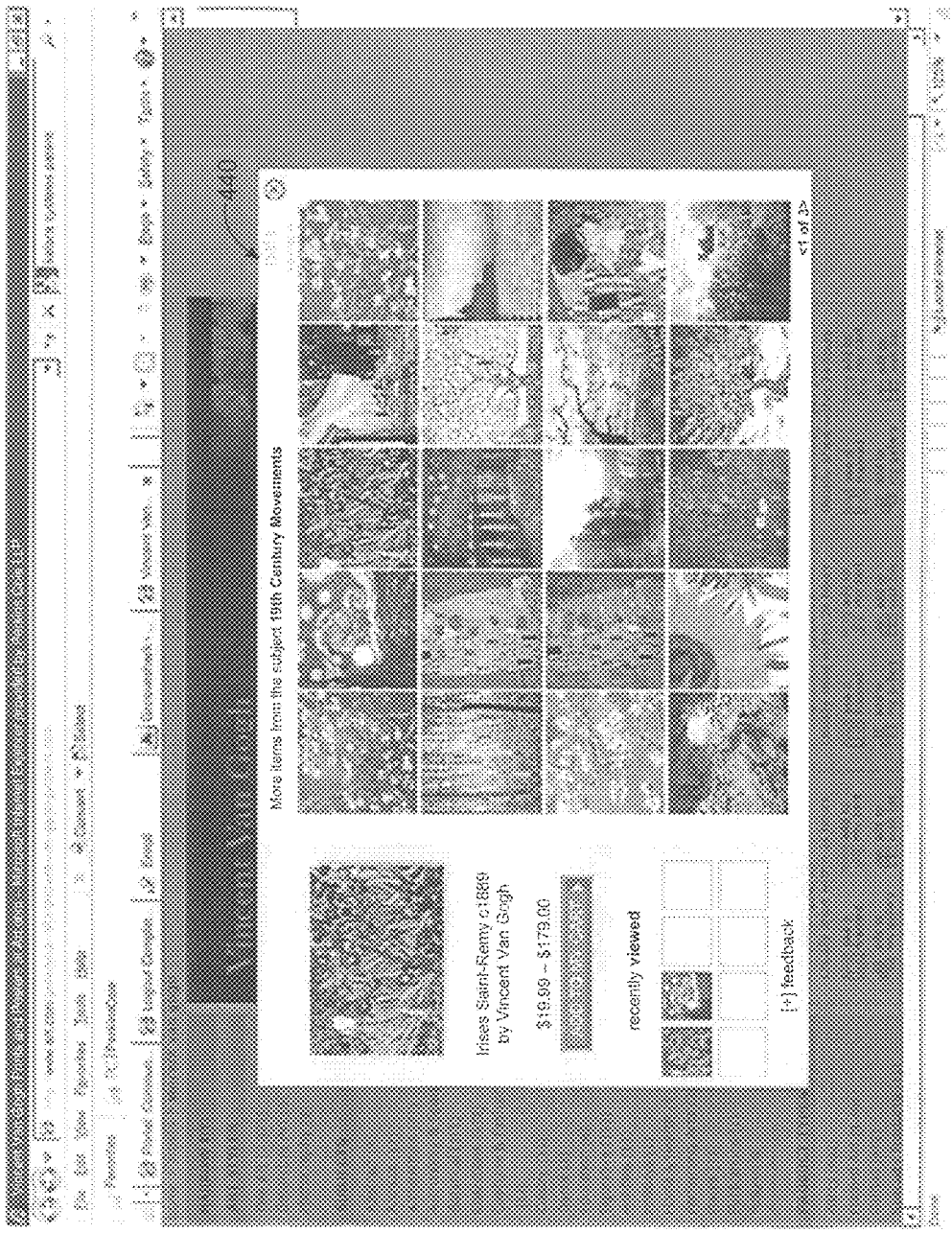
FIG. 4d illustrates broadening the discovery of art images based on a selection of a sub-dimension.

FIG. 4d illustrates broadening the discovery for art images based on a selection of a sub-dimension. Specifically, FIG. 4d displays discovered art images 440 based on the user's selection of the "19$^{th}$ Century Movements" sub-dimension 432 of the subject dimension 428 of The Starry Night 420. The discovered art images 440 are displayed because each image has a characteristic associated with art from "19$^{th}$ Century Movements." However, the discovered art images' 440 other dimensions may be different from any or all other dimensions 101 and/or sub-dimensions associated with The Starry Night 420. In this regard, the discovered art images 440 broaden the type and range of art images 103 from which the user can continue exploration. Similar to the description and illustration of FIG. 4b, an art image from the discovered art images 440 can be selected by the user to display its dimensions 101 that, when selected, further direct the user's discovery process according to the selected dimension.

Figure 4E:
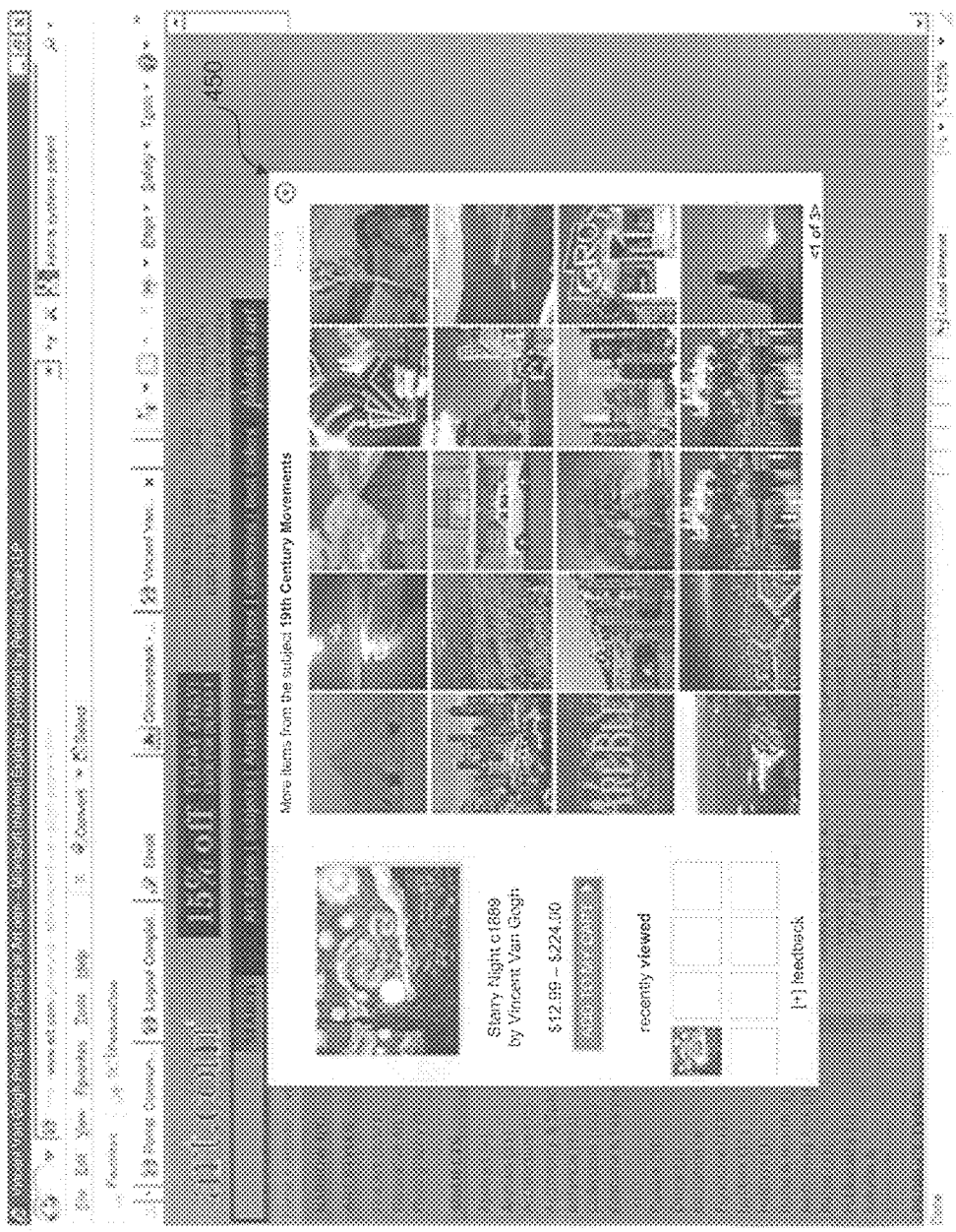
FIG. 4e illustrates art images based on a selection of a color dimension.

FIG. 4e illustrates art images having a color dimension of a selected art image. Specifically, FIG. 4e shows discovered art images 450 displayed as a result of the user's selection of the color dimension 424 of The Starry Night 420. Each discovered art image 450 has colors similar to those used in The Starry Night 420. However, to broaden the types of art images 103 available for discovery, the other dimensions of the discovered art images 450 may be different from any or all other dimensions 101 that are associated with The Starry Night 420. Similar to the description and illustration of FIG. 4b, a discovered art image 440 can be selected by the user to display its dimensions 101 that, when selected, further direct the user's discovery process according to that selected dimension.

Figure 4F:
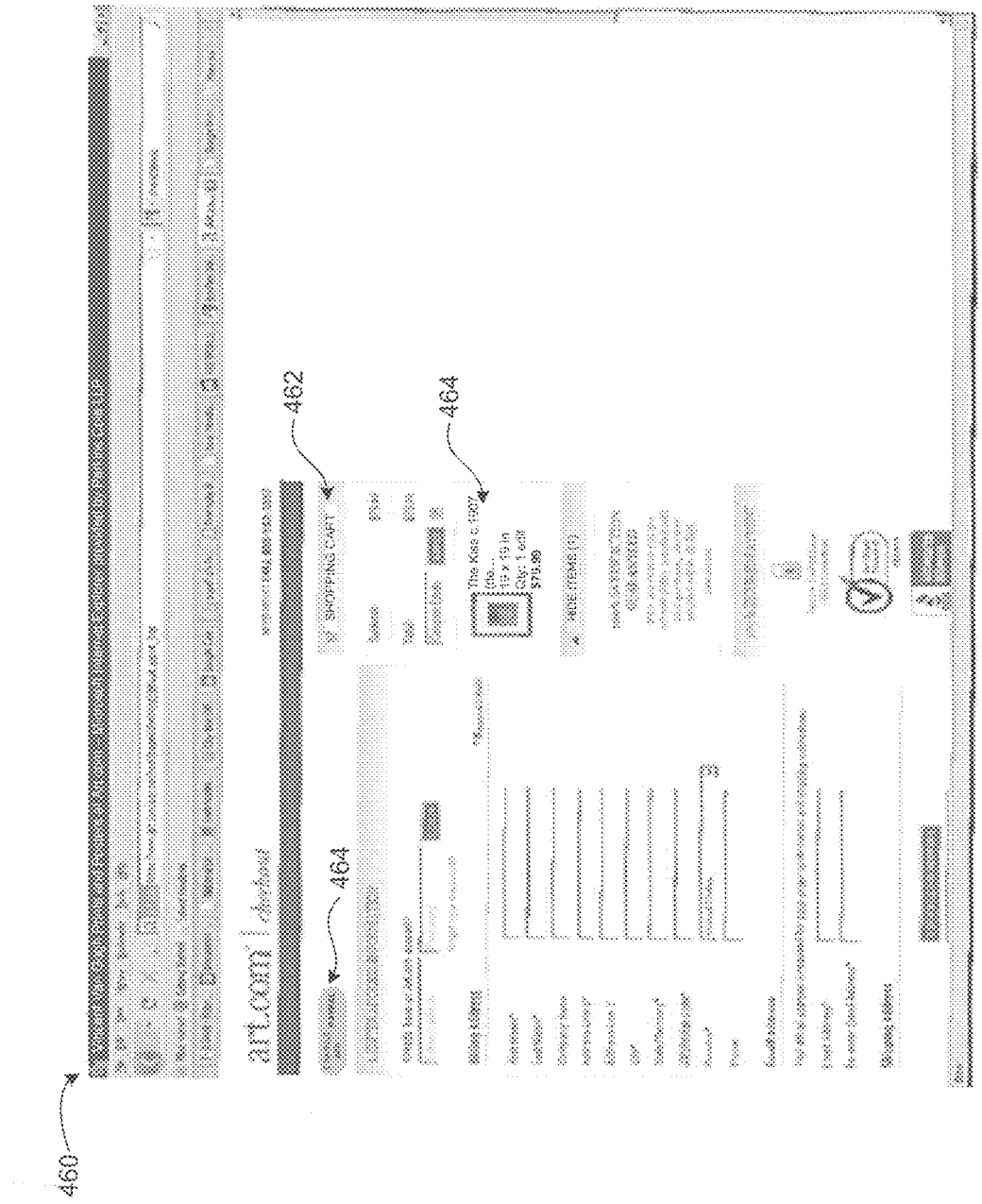
FIG. 4f illustrates an e-commerce purchasing system that can be utilized by the user to purchase a discovered art image.

FIG. 4f illustrates an e-commerce purchasing system 460 that can be utilized by the user to purchase a discovered art image. Specifically, FIG. 4f shows a shopping cart 462 that can receive one or more discovered art images 464. Various billing functionality can be built into the e-commerce platform to enable the use of Credit Cards, Debit Cards, bank transfers, and third-party transactions, such as PayPal 464.

Figure 5:
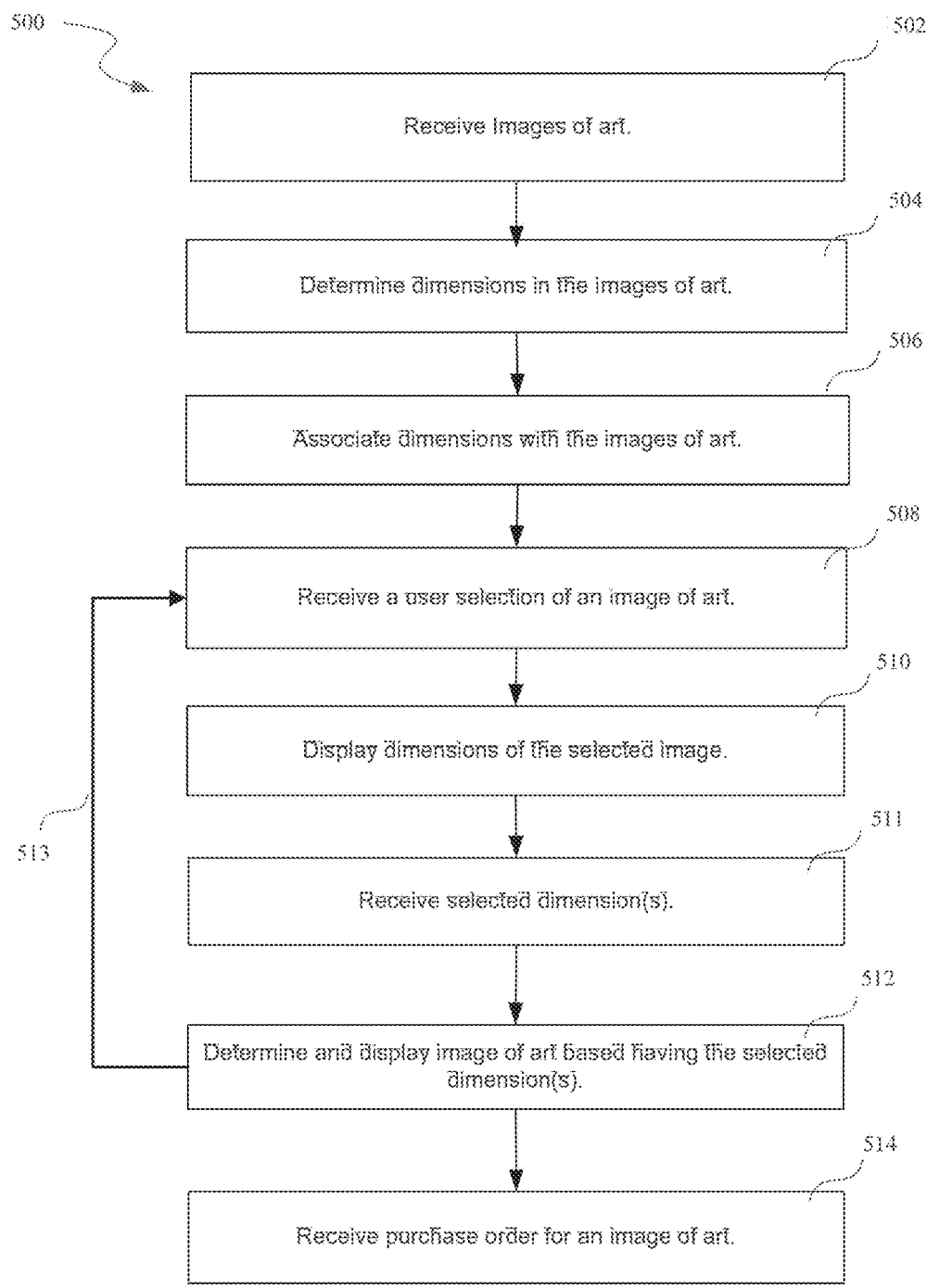
FIG. 5 is a flow diagram illustrating a process for determining a user's preference for art based on the user's selection of a dimension of an art image.

FIG. 5 illustrates a high-level overview of a sequence 500 utilized by the disclosed method to make available for purchase an art image 103 discovered by searching for dimensions 101 in a collection of art images 103.

Step 502 describes a process for receiving art images 103 at the server 102. The art images 103 can be locally uploaded as data 220 to the storage device 208 and/or remotely received via the network 106 to the network adapter 206.

Step 504 describes the process for determining one or more dimensions 101 for each of the art images 103. In one embodiment, the dimensions 101 are provided manually with the art images 103 as data 220. Alternatively or additionally, dimensions 101 can be automatically determined by the dimension module 212. For example, the dimension module 212 can be configured with an algorithm used to detect a characteristic of a dimension 101 from an art image's 103 metadata.

Step 506 describes the process for associating dimensions 101 with a respective image of the art images 103 such that the art image 101 and the dimension 101 are easily retrieved by the dimension module 212. For example, a database or file system can be used to associate an art image 101 and its corresponding dimension(s) 101.

Step 508 describes the process of receiving a user's selection of an art image 103. As previously described, art images 103 are displayed at a client 104. A user at the client 104 can select a displayed art image 103 and/or search for another art image 103. Several art images 103 can be simultaneously displayed by the GUI tool 300 at the client 104. The user can select a particular art image 103 by navigating an input device, such as a mouse, to the particular image and clicking or otherwise indicating a selection of the particular image. In another embodiment, the user selects a particular art image simply by placing an indicator, such as a mouse or a finger, on or near the image.

Step 510 describes the process of displaying the dimensions 101 of the art image 103 selected in step 508. Once the user, in step 508, locates a desirable art image 103, the user can select that image to reveal one or more of its dimensions 101. Dimensions 101 can be displayed at the client 104. In one embodiment, the dimensions of an art image 103 are displayed simultaneously with the art image 104. In a further embodiment, the dimensions are displayed across one or more axes of the perimeter of the art image 104. Dimensions 101 can be represented as text, hypertext, or a graphical indicator of the dimension 101, such as an arrow or other symbol, for example. In one embodiment, the dimension 101, or its graphical representation, is selectable. Selecting the dimension 101 can reveal one or more sub-dimensions related to the selected dimension 101. Alternatively or additionally, selecting a dimension or sub-dimension can initiate a search for another art image that has a dimension that is substantially similar to the selected dimension.

Step 511 describes the process for receiving the dimensions selected in step 510. A selected dimension can be received from the client 104 via the network 106. Communications between the client 104 and the server 102 may use any communication protocol know in the art for transporting digital or analogue information across a network 106, such as the Internet or a local area network (LAN). In one embodiment, information such as a selected dimension is sent in the form or data packets that carry portions of the selected dimension to the server 102.

Step 512 describes the process for determining and sending new art images 103 to the client 104 based on the selected dimensions that were received in step 511. Once the selected dimensions are received, in step 511, the search module 216 uses the selected dimensions as a query to search for art images 103 that have a dimension that is similar to the selected dimension. For instance, if the selected dimension was an artist dimension 506 for "Van Gogh," for example, those art images 103 having an artist-dimension associated with the artist Van Gogh are returned and sent to the display 105 at the client 104.

Steps 508-512 can be repeated (513) while the user discovers art based on selecting one or more dimensions 101 of the art image displayed at the client 104. For example, the user may first select an image of Van Gogh's The Starry Night that is displayed on a webpage and/or a GUI provided by the server 102. Upon selection of the image of The Starry Night, its dimensions 101 are displayed at the client 104, per step 508. The displayed dimension can include any of the dimensions 101 associated with The Starry Night, such as a color dimension 308, artist dimension 306, subject-matter dimension 510, or similarity dimension 512. If the user selects the color dimension 308, it is sent to the server 102, per step 511, where it is used as a query to find and return other art images 103 that contain similar colors as those used in The Starry Night, per step 512. For example, one image with similar colors as The Starry Night may be a picture of wildflowers, and another image may be of a Chinese vase. These other images are sent for delivery to the client 104, where the user can, per step 508, select one of the images to display its dimensions, per step 510. For example, the user may determine that the picture of the wildflowers is preferable and select that image to reveal its dimensions 101. Per step 408, the user may choose the similarity dimension, which, per steps 508-512, could result in the search and display of other pictures of wildflowers that have the same subject, color, and/or other dimensions that are similar to the dimensions of the image of the wildflower. This process can repeat (513) until the user discovers an art image 103 that the user would like to purchase.

Step 514 describes the process for receiving an order to purchase a version of the art image 103 discovered in steps 508-512. Once the user discovers an art image 103 that he or she wants to purchase, the user places an order for a version of the art image 103 at the server 102. A version of the art image 103 may be customized by the user. For example, the user may be able to customize the art image 103 by changing the size, matting, framing, and covering of the art image 103. The art image 103 or the customized art image may be added to a shopping cart of a standard e-commerce system. The image processing environment 100 is compatible with e-commerce systems and the disclosed method and system have the necessary technology to support financial transactions, including credit card and debit card-based transactions, wire transfers, and check processing.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits, programmable logic devices, field-programmable gate arrays, etc.

Software or firmware for implementing the techniques introduced here may be stored on a machine-readable storage medium and may be executed by one or more general-purpose or special-purpose programmable microprocessors. A machine-readable medium, as the term is used herein, includes any mechanism that can store information in a form accessible by a machine (a machine may be, for example, a computer, network device, cellular phone, particular digital assistant, manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices), etc.

The term "logic," as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
retrieving, in response to a request received at a computer system from a user, a first plurality of images at a graphical user interface (GUI) tool designed for discovering images of objects;
receiving, at the computer system, a user selection of a first image of the first plurality of images;
retrieving, at the computer system, a plurality of dimensions of the first image;
outputting, at the computer system, the dimensions of the first image based on a shape of the first image, the outputting the dimensions including:
determining the shape of the first image,
determining a number of the dimensions to be displayed as a function of the shape, and
displaying the determined number of dimensions in association with the first image;
receiving, at the computer system, a selection of one or more of the dimensions of the first image;
performing, at the computer system, using the selected one or more dimensions of the first image as a first query, a first automated search for a second plurality of images, wherein each image of the second plurality of images has one or more dimensions corresponding to the one or more selected dimensions of the first image; and
displaying, at the computer system, the second plurality of images resulting from the first query.

2. The method of claim 1, wherein the shape of the first image is a polygon having a predetermined number of sides, and wherein displaying the determined number of dimensions includes displaying at least one dimension on each side.

3. The method of claim 1, further comprising:
receiving a selection of a second image from the second plurality of images; and
displaying the second image and one or more dimensions of the second image at the GUI tool, wherein a number of the one or more dimensions of the second image displayed is determined as a function of a shape of the second image;
receiving a selection of a dimension of the one or more dimensions of the second image; and
performing, using the selected dimension a second query to perform a second search for a third plurality of images, wherein each image of the third plurality of images has a dimension corresponding to the selected dimension of the second image.

4. The method of claim 2, wherein the second plurality of images contains images not included in the first plurality of images and the third plurality of images contains images not included in the second plurality of images.

5. The method of claim 1, further comprising:
associating one or more dimensions with each image of the first and second plurality of images.

6. The method of claim 1, further comprising:
determining the one or more dimensions of the first image based on a characteristic of the first image, wherein the characteristic is a distinguishable quality detectable within the first image.

7. The method of claim 1, wherein the first, second and third plurality of images are art images.

8. The method of claim 5, wherein a dimension-of the one or more dimensions includes at least one of a color dimension, an artist dimension, a similarity dimension, and a subject dimension, wherein the color dimension includes colors within an image of the first or second plurality of images, wherein the artist dimension includes a name of the creator of the image, and wherein the subject dimension includes one or more themes within the image.

9. The method of claim 8, wherein the similarity dimension includes a combination of characteristics used to determine a degree of similarity of the image with a next image of the first or second plurality of images.

10. The method of claim 9, wherein the combination of characteristics includes two or more of a texture characteristic, a lighting characteristic, a color balance characteristic, a shape characteristic, a contour characteristic, and a face recognition characteristic.

11. A device for providing a graphical user interface for discovering images of art works, comprising:
a processor; and
a memory coupled to the processor and having instructions executable by the processor to cause the device to:
display a first plurality of images of art works, wherein when a first image of the images is selected, an enlarged version of the first image is displayed, the enlarged first image overlapping some of the remaining of the images, wherein the enlarged version of the image is of a particular polygonal shape, the polygonal shape including a specific number of sides;
display a representation of a plurality of dimensions of the first image displayed in association with the first image, wherein a number of dimensions displayed in association with the first image is determined as a function of the polygonal shape of the first image with at least one dimension displayed per each of the sides and alongside each of the sides;
display a dimension selector, when selected by a user, initiates a search action associated with each of the dimensions that performs, using a selected one or more dimensions of the first image as a first query, a first automated search for a second plurality of images of the art works, wherein each image of the second plurality of images has one or more dimensions corresponding to the one or more selected dimensions of the first image; and
display a representation of the second plurality of images resulting from the first query.

12. The graphical user interface of claim 11, wherein the number of dimensions displayed is at least as many as the number of sides of the polygonal shape of the first image.

13. The graphical user interface of claim 11 further comprising:
a first action associated with a dimension of the dimensions which, when performed, displays one or more sub-dimensions for the selected dimension, the one or more sub-dimensions displayed as a list interface, the list interface extending from the dimension.

14. The graphical user interface of claim 11 further comprising:
a text input interface to receive text including keywords for searching art images.

15. The graphical user interface of claim 11, wherein the first art image is displayed using a webpage, and wherein the representation is a selectable object on the webpage.

16. The graphical user interface of claim 15, wherein the selectable object is a graphical image.

17. The graphical user interface of claim 15, wherein the selectable object is textual.

18. A non-transitory computer-readable storage medium storing computer-readable instructions, comprising:
instructions for retrieving, in response to a request received from a user, a first plurality of images at a graphical user interface (GUI) tool designed for discovering images of objects;
instructions for receiving a user selection of a first image of the first plurality of images;
instructions for retrieving a plurality of dimensions of the first image;
instructions for outputting the dimensions of the first image based on a shape of the first image, the outputting the dimensions including:
determining the shape of the first image,
determining a number of the dimensions to be displayed as a function of the shape, and
displaying the determined number of dimensions in association with the first image;
instructions for receiving a selection of one or more of the dimensions of the first image;
instructions for performing using the selected one or more dimensions of the first image as a first query, a first automated search for a second plurality of images, wherein each image of the second plurality of images has one or more dimensions corresponding to the one or more selected dimensions of the first image; and
instructions for displaying, at the computer system, the second plurality of images resulting from the first query.

* * * * *